United States Patent [19]

Bartholomew

[11] Patent Number: 5,067,754

[45] Date of Patent: * Nov. 26, 1991

[54] SWIVELABLE QUICK CONNECTOR ASSEMBLY

[75] Inventor: Donald D. Bartholomew, Marine City, Mich.

[73] Assignee: Propietary Technology, Inc., Southfield, Mich.

[ * ] Notice: The portion of the term of this patent subsequent to Jul. 22, 2003 has been disclaimed.

[21] Appl. No.: 453,378

[22] Filed: Dec. 12, 1989

Related U.S. Application Data

[60] Continuation of Ser. No. 303,975, Jan. 27, 1989, abandoned, which is a continuation of Ser. No. 864,761, May 19, 1986, abandoned, which is a division of Ser. No. 360,201, Mar. 22, 1982, Pat. No. 4,601,497, which is a continuation-in-part of Ser. No. 201,711, Oct. 29, 1980, Pat. No. 4,423,892.

[51] Int. Cl.$^5$ ............................................. F16L 37/12
[52] U.S. Cl. .................................... 285/319; 285/348; 285/921; 285/308
[58] Field of Search ............... 285/319, 348, 921, 308, 285/321, 340, 281, 924

[56] References Cited

U.S. PATENT DOCUMENTS

| | | |
|---|---|---|
| 4,541,658 | 9/1985 | Bartholomew ...................... 285/319 |
| 4,601,497 | 7/1986 | Bartholomew ...................... 285/319 |
| 4,748,175 | 8/1990 | Bartholomew ...................... 285/319 |
| 4,778,203 | 10/1988 | Bartholomew ...................... 285/319 |
| 4,981,586 | 1/1991 | Bartholomew ...................... 285/319 |

Primary Examiner—Erie K. Nicholson
Attorney, Agent, or Firm—Harness, Dickey & Pierce

[57] ABSTRACT

A swivelable quick connect assembly for use with tubular conduits is disclosed as comprising a housing having an axial bore for receiving one end of the conduit, an elastomeric ring-like seal is disposed in the bore for providing a fluid tight seal between confronting portions of the conduit and the housing, an annular bushing is disposed in the bore for positioning the seal and for guiding the one end of the conduit into nesting relationship with the bore, and a retainer is detachably secured to the housing and is cooperable with an annular projection on the conduit for securing the conduit in its operative position within the bore, the retainer having resilient deformable portions which are adapted to snap over the locking wall upon insertion of the conduit into the housing bore.

6 Claims, 2 Drawing Sheets

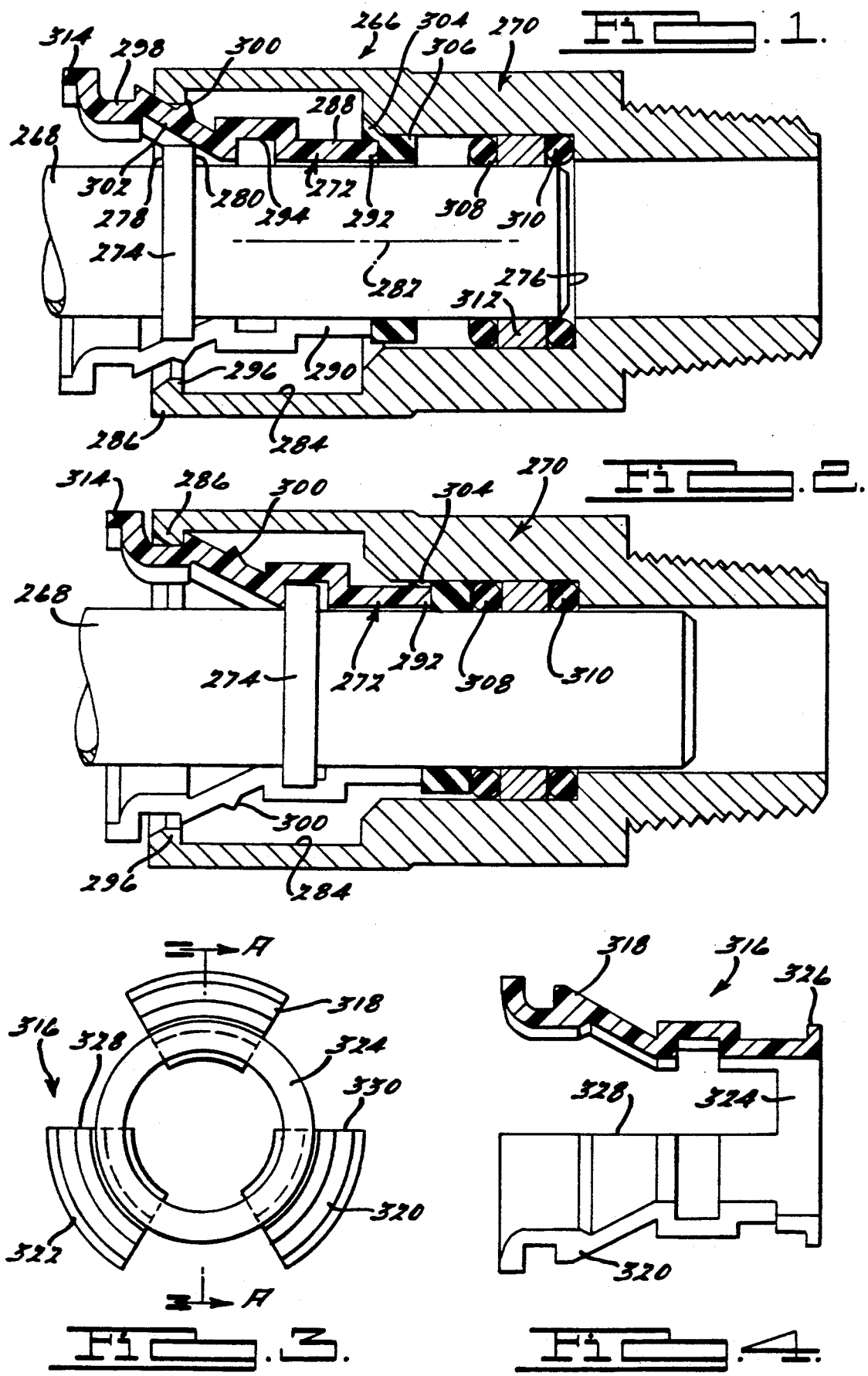

SWIVELABLE QUICK CONNECTOR ASSEMBLY

CROSS REFERENCE TO A RELATED APPLICATION

This is a continuation of U.S. patent application Ser. No. 07/303,975, filed Jan. 27, 1989 now abandoned; which is a continuation application of Ser. No. 864,761, filed May 19, 1986 now abandoned; which is a divisional application of Ser. No. 360,201, filed Mar. 22, 1982 now U.S. Pat. No. 4,601,497; which is a continuation-in-part application of Ser. No. 201,711, filed Oct. 29, 1980, which is now U.S. Pat. No. 4,423,892; all entitled "Swivelable Quick Connector Assembly".

BACKGROUND AND SUMMARY OF THE INVENTION

The present invention relates to a connector assembly for providing a swivelable quick connection.

In the automotive industry, as well as for many other industries, the need always exists for low-cost, reliable, and easy to assemble components. This need is especially apparent with respect to providing a connection between fluid carrying conduits, such as a fuel or refrigerant lines. In older threaded connectors, substantial assembly time could be accumulated in screwing on a cap to a fitting and tightening the cap down to the proper torque needed to provide for a fluid tight seal. Further, an inventory would have to be maintained to keep track of the number of caps and fittings, and any liners or other components that may be necessary. Also, retightening of the caps may be required to maintain the seal after the automobile or other system has been put in use.

Accordingly, it is the primary object of the present invention to provide an improved connector assembly for providing a swivelable quick connection between fluid conveying conduits.

In addition, it is an object of the present invention to provide a pre-assembled connector housing and retainer element so that a connection to a tubular fluid conveying conduit may be made in one step without resorting to any tools.

Another object of the present invention is to provide a pre-assembled connector housing and retainer element so that a snapping connection may be made to a tubular fluid conveying conduit.

It is another object of the present invention to provide a pre-assembled connector conduit unit which requires only a one-step snapping connection to be joined to a connector housing.

It is yet another object of the present invention to provide a removable, disposable cover for protecting the pre-assembled connector conduit unit.

It is a further object of the present invention to provide a disposable stuffer-plug for the connector assembly which is adapted to install one or more sealing elements in an axial bore of the connector housing and detachably secure a retainer element to the connector housing, as well as to seal the axial bore of the connector housing.

It is still a further object of the present invention to provide a connector assembly which employs a check valve unit disposed in the axial bore of the housing for selectively blocking fluid flow.

It is also an object of the present invention to provide an improved retainer element which operates to both secure the conduit in the axial bore of the housing and position the sealing element within the axial bore of the housing.

It is a more specific object of the present invention to provide an improved retainer element formed with three or more leg members which operate to detachably secure the retainer element to the housing, the sealing means within the housing, the conduit in its operative position within the axial bore of the housing, and provide better resistance to off axis forces on the conduit.

To achieve the foregoing objects, the present invention provides a swivelable connector assembly which generally comprises a tubular conduit, a housing, sealing means, and retainer means. The tubular conduit is adapted to convey fluid and is formed with an annular projection disposed a predetermined distance from the end of the conduit to be connected. The housing is formed with an axial bore for receiving the conduit at a first end and for providing a fluid path at a second end, and includes an inwardly extending annular lip (or suitable apertures) at the first end to detachably secure the retainer means to the housing. The sealing means is disposed within the axial bore of the housing for providing a fluid tight seal between confronting portions of the conduit and the housing. The retainer means is adapted to be disposed generally within the axial bore of the housing for cooperating with the annular projection of the conduit to secure the conduit in its operative position within the axial bore of the housing. The retainer means includes three or more circumferentially spaced resilient deformable leg members which extend from an integral collar member at one end thereof. Each of the leg members has an outwardly opening channel portion which is adapted to receive the inwardly extending lip of the housing to secure the retainer means to the housing, and an inwardly opening channel portion adapted to receive the annular projection of the conduit for securing the conduit in its operative position within the axial bore of the housing. The ring from which the legs extend may additionally serve to position and retain the sealing means.

Additional objects and advantages of the present invention will become apparent from reading of the detailed description of the preferred embodiments which makes reference to the following set of drawings in which:

BRIEF DESCRIPTION OF THE DRAWINGS

FIG. 1 is a side elevation view, partially in cross-section, of a connector assembly according to the present invention in a partially installed position.

FIG. 2 is a side elevation view, partially in cross-section, of the connector assembly illustrated in FIG. 1 with the tubular conduit shown in its operative position in the axial bore of the housing.

FIG. 4 is a side elevation view, partially in cross-section, of the retainer element illustrated in FIG. 3, taken along lines A—A.

FIG. 5 is a side elevation view, partially in cross-section of an elbow connector assembly according to the present invention.

FIG. 6 is a side elevation view, partially in cross-section of another connector assembly according to the present invention.

FIG. 7 is a cross-sectional side elevation view of the connector assembly illustrated in FIG. 6, particularly showing the retainer element in a partially installed position.

DETAILED DESCRIPTION OF THE PREFERRED EMBODIMENTS

Figure 3:
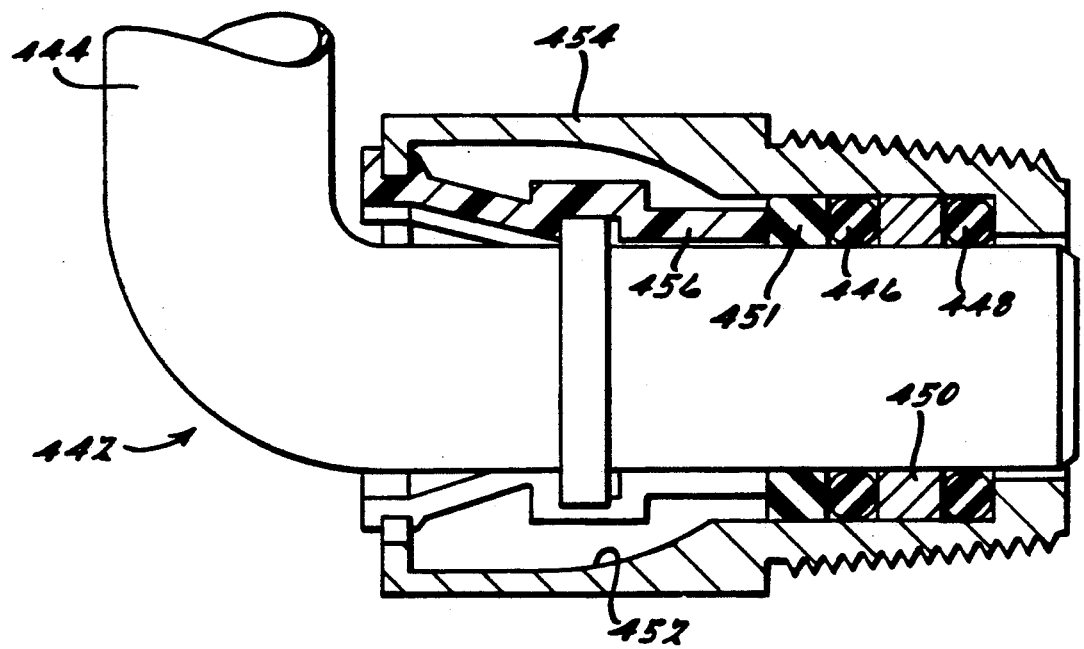
FIG. 3 is a front elevation view of an improved retainer element.

Referring to FIG. 1, a side elevation view of a connector assembly 266 is shown, partially in cross-section, in a partially installed position. The connector assembly 266 includes a tubular conduit 268, a housing 270, and a retainer element 272. The conduit 268 is formed with an annular projection 274 disposed a predetermined lead distance from an end 276 of the conduit to be connected. It should be noted that the annular projection 274 is symmetrical in shape, in that the opposing surfaces 278 and 280 of the projection are generally transverse to a central axis 282 of the conduit 268 and generally parallel each other.

The retainer element 272 is adapted to be disposed generally within an axial bore 284 of the housing 270 and is detachably secured to the housing at a first end 286 of the housing. The retainer serves to secure the conduit 268 in its operative position within the axial bore 284 of the housing 270 by cooperating with the annular projection 274 of the conduit. The retainer element 272 includes three circumferentially spaced resilient, deformable leg members, of which only two leg members 288 and 290 are shown in FIG. 1. These leg members extend from an integral collar member 292 at one end of the retainer element 272. The collar member 292 is adapted to provide an opening sufficient to permit the end 276 of the conduit to pass therethrough. Each of the leg members is formed with an inwardly opening channel portion 294 which is adapted to receive the annular projection 274 of the conduit 268 for securing the conduit in its operative position within the axial bore 284 of the housing 270. The shape of the inwardly opening channel portion 294 of the leg members is generally complimentary to the shape of the annular projection 274 of the conduit. Although various suitable shapes may be provided for the inwardly opening channel portion 294 and the annular projection 274, the shapes should be such as to lock the conduit into the axial bore 284 of the housing and prevent or limit axial movement of the conduit relative to the housing. Each of the leg members are also formed with an outwardly opening channel portion 298 which is adapted to receive an inwardly extending annular lip 296 of the housing to secure the retainer element 272 to the housing. The shape of the outwardly opening channel portion 298 of the leg members and the annular lip 296 of the housing are subject to the same considerations noted above for the inwardly opening channel portion 294 of the leg members and the annular projection 274 of the conduit 268. However, it may also be noted that rather than forming the annular lip 296 of the housing 270 by casting or milling, the annular lip may also be formed by rolling in the first end 286 of the housing.

The leg members (288, 290) of the retainer element 272 are adapted to deform in response to the insertion of the retainer element into the axial bore 284 of the housing 270 and permit the annular lip 296 of the housing to snap into the outwardly opening channel portion of each of the leg members. Similarly, the leg members of the retainer element 272 are adapted to deform in response to the insertion of the conduit 268 into the axial bore 284 of the housing 270 and through the collar member 292 of the retainer element 272, and permit the annular projection 274 of the conduit to snap into the inwardly opening channel portion 294 of the leg members. However, one feature of the connector assembly 266 is that the annular projection 274 of the conduit is adapted to snap into the inwardly opening channel portion 294 of the leg members (288, 290) before the annular lip 296 of the housing 270 snaps into the outwardly opening channel portion 298 of the leg members. This feature will permit the annular projection 274 of the conduit to easily snap into the inwardly opening channel portion 294 of the leg members. This feature is achieved by providing for two sets of tabs which cooperate to maintain the retainer element 272 in the partially installed position shown in FIG. 1 until the annular projection 274 of the conduit 268 has snapped into the inwardly opening channel portion 294 of the retainer element leg members. In this position, the retainer is adapted to limit axial movement of the bushing 306 within the internal chamber 284 in one direction while the sealing members 308, 310, and 312 limit movement in the other direction as seen in FIG. 2. The first set of tabs 300 extend outwardly along an inclined portion 302 of the retainer element leg members, and operate to prevent the retainer element 272 from falling out of the axial bore 284 of the housing 270. The bushing 306 is interspaced between the sealing elements 308, 310 and 312 and the retainer 272 and is retained at least partially within the second annular portion of the chamber 284 upon disassembly of the retainer 272 and male element 274 from the female element 270. The bushing 306 limits off axis movement of the male member 274 as well as preventing the sealing elements 308, 310, and 312 from being expelled from the second chamber portion under the influence of fluid pressure in the passage 284. One or more first tabs 300 may be provided on each of the retainer element leg members as may be appropriate in the particular application. The second set of tabs 304 are formed to extend generally outwardly from a bushing 306 disposed within the axial bore 284 of the housing 270. In this case, the relatively non-deformable retainer portion 294 permits the non-deformable portion 294 to be biased radially outwardly by the enlarged diameter portion 280 of the male element 274 as the male element 274 is inserted axially into the chamber 284. Once the enlarged diameter portion 280 is within the inwardly open channel portion 294, the relatively non-deformable portion 294 snaps radially inwardly adjacent the axially outer side of the enlarged diameter portion 280 as seen in FIG. 2. The second tabs 304 are shaped such that they will resist the further insertion of the retainer element 272 into the axial bore 284 from the partially installed position until the annular projection 274 snaps into the inwardly opening channel portion 294 of the retainer element. However, once the conduit 268 is thus joined or united to the retainer element 272, the second tabs 304 will yield and deflect inwardly to permit the further insertion of the conduit 268 and the retainer element 272 into the axial bore 284 of the housing 270 until the annular lip 296 of the housing snaps into the outwardly opening channel portion 298 of each of the retainer element leg members and the conduit is in its operative position with the axial bore of the housing. FIG. 2 illustrates the connector assembly 266 with the conduit 268 shown in its operative position within the axial bore 284 of the housing 270.

The connector assembly 266 also includes two elastomeric rings 308 and 310 disposed within the axial bore 284 of the housing 270 for providing a fluid tight seal between confronting portions of the conduit 268 and the housing. The elastomeric rings are also separated by a suitable sleeve 312. It should be noted that once the conduit 268 is connected to the housing 270 via the retainer element 272, the conduit may be subsequently released and withdrawn from the axial bore 284 of the housing as follows. By manually deflecting each of the retainer element leg members at a finger portion 314 (extending out of the bore 284 of the housing) inwardly toward the central axis 282 sufficiently to disengage the annular lip 296 of the housing from the outwardly opening channel portion 298 of the leg members, the conduit 268 and the retainer element 272 will be permitted to slide out of the axial bore of the housing. It should be appreciated that the dimensions of the retainer element 272 and the housing 270 relative to the outer diameter of the conduit 268 should be such as to provide sufficient radial clearance between the retainer element and the conduit to permit the deflection of the retainer element leg members necessary for the outwardly opening channel portion 298 to clear the annular lip 296 of the housing. Accordingly, it will be seen that the connector assembly 266 is adapted to readily permit subsequent disconnection of the conduit from the housing. One advantage of this feature of the present invention is that seals may be conveniently replaced without having to replace any of the other components of the connector assembly.

Referring to FIGS. 3 through 4, a front and a side elevation view of a retainer element 316 is shown. Retainer element 316 is similar to the retainer element 272, in that it generally comprises three circumferentially spaced resilient, deformable leg members 318, 320 and 322, extending from an integral collar member 324 at one end thereof. However, as best illustrated in FIG. 4, the retainer element 316 includes an annular flange 326 extending outwardly from the collar member 324 for positioning the sealing element(s) within the axial bore of the connector housing. Since the flange 326 serves a principal function normally provided by a bushing, it should be appreciated that the need for the bushing may be eliminated in the appropriate application. Thus, the collar 324 provides a means orientating and supporting the relatively deformable portion of the retainer 272 within the chamber 284.

As may best be illustrated in FIG. 3, in one form of the present invention the leg members 318-320 are equally spaced circumferentially, and the opposing axially extending edges of any two of the leg members from a substantially straight line. For example, edge 328 of leg member 322 and edge 330 of leg member 320 form a horizontally-extending straight line. Thus it may also be noted that any two of the leg members span a maximum of one hundred and eighty degrees (180°) (including the circumferential space between the leg members). It may also be noted that the provision of three leg members provides certain advantages in relation to a retainer element with either two or four leg members. For example, in order to disconnect a conduit from a housing, the finger portions of a three leg retainer element will be easier to grasp than a four leg retainer element. Additionally, a three leg retainer element will provide greater circumferential engagement than a two leg retainer element. Furthermore, with a two leg retainer element, a larger diameter connector housing will be required relative to a three leg retainer element in order to permit the leg members to expand around the annular projection of the conduit.

With respect to the materials from which retainer elements 272 and 316 may be constructed, flexible thermoplastic or metal spring stock which will withstand the temperature and chemical environment expected to be encountered in the application is preferred. For example, typical nylons which are considered to be useful are types 6, 6-6, 6-10, 6-12, 11 and 12. It may also be appropriate to add glass reinforcement up to 30% for increased strength in the particular application.

Referring to FIG. 5, a side elevation view of an elbow connector assembly 442 is shown, partially in cross-section. FIG. 26 serves to illustrate that a bend (approximately 90 degrees) in a tubular conduit 444 will permit a connector assembly as previously described to form an elbow connector assembly and eliminate the need for a separate elbow connector. FIG. 5 also serves to illustrate that without the conduit 444, the remaining components of the connector assembly 442 provide a pre-assembled connector conduit unit. In other words, with the sealing elements 446-448, the sleeve 450 and the bushing 451 disposed in the axial bore 452 of the connector housing 454, and the retainer element 456 detachably secured to the housing, then the conduit 444 may be united to the housing in a one-step snapping connection. FIG. 5 further serves to illustrate that the axial bore 452 of the housing 454 may be sloped in the appropriate application.

Referring to FIG. 6, a side elevation view of another connector assembly 504 is shown, partially in cross-section. The connector assembly 504 features a retainer element 506 which is similar to the retainer element 316 of FIGS. 3 and 4. In FIG. 6, the retainer element 506 is shown in its operative position generally within the axial bore 508 of the connector housing 510. However, retainer element 506 is also adapted to be disposed in a partially installed position, as illustrated in FIG. 7. In the partially installed position, the retainer element 506 will engage the annular lip 512 of the housing between the inwardly opening channel portion 514 and the outwardly opening channel portion 516 of the retainer element. Accordingly, it should be appreciated that this engagement will operate to maintain the retainer element 506 in this position until the conduit 518 is to be inserted into the axial bore 508 of the housing 510. It should be noted that as the conduit is inserted into the axial bore 508 of the housing 510, the annular projection 520 passes freely into the inwardly opening channel portion 514, and the operator should be able to visually observe that the annular projection 520 of the conduit has been received into the inwardly opening channel portions 514 of the retainer element leg members. Upon the further insertion of the conduit 518 into the axial bore 508 of the housing 510, the retainer element 506 will be carried with the conduit until the annular lip 512 of the housing snaps into the outwardly opening channel portions of the retainer element leg members. Although each of the leg members of the retainer element 506 is provided with a finger portion 522 extending out of the axial bore 508, this feature of the retainer element may be deleted such that once the conduit 518 is in its operative position within the axial bore the retainer element will be flush with the first end 524 of the housing and the retainer element will not be visible from the side of the connector assembly. Accordingly, this modification of the retainer element 506 will provide the operator with a visible indication that the conduit is in its operative position and the assembly is complete.

The connector assembly 504 is also provided with a filter or screen 525 which serves to filter particulate matter from the fluid flowing through the bore of the connector assembly. The filter 525 is disposed in a reduced diameter portion 526 of the bore 508, and is adapted to be interposed between the end of the conduit 518 to be connected and a shoulder 527 of the housing 510. The filter 525 may be made from any suitable material, such as metal wire or plastic mesh. It should be understood that the provision of the filter 525 is not limited to the connector assembly 504, and the filter may be employed in other suitable connector housings.

While the above description constitutes the preferred embodiments of the present invention, it will be appreciated that the invention is susceptible to modification, variation and change without departing from the proper scope and fair meaning of the accompanying claims.

I claim:

1. In combination in a coupling for use in communicating a fluid media and comprising male, female, retainer, sealing and bushing elements, said male element being generally tubular shaped and including:
   (a) a first axially extending portion having a relatively smooth cylindrical exterior surface and disposed adjacent the terminal end of said male element,
   (b) a second axially extending portion of enlarged diameter disposed axially outwardly from said first portion and adapted for engagement with said retainer element,
   (c) a third axially extending portion disposed axially outwardly from said second portion and having an outer diameter smaller than the outer diameter of said second portion, said sealing element being of an annular configuration and disposed in axial registry with said first axially extending portion of said male element and having an inner diameter sealing engaged with said exterior surface thereof, said female element having an internal chamber adapted for operative reception of at least a portion of said male element and comprising;
   (a) a first annular portion communicable with a fluid passage and adapted to receive the terminal end of said male element;
   (b) a second annular portion disposed axially outwardly from said first annular portion and having a diameter greater than said first annular portion and comprising a cylindrical wall adapted for sealing engagement with the outer diameter of said sealing element,
   (c) a third annular portion disposed axially outwardly from said second annular portion and having a diameter at least as great as the outer diameter of said sealing element and adapted to operatively receive said retainer element, said third annular portion having means defining at least one radially extending surface cooperable with said retainer element for securing the same within said coupling and preventing disassembly of said male element from said female element, said bushing element being interspaced between said sealing element and said retainer element and being retained at least partially within said second annular chamber portion of said chamber upon disassembly of said retainer and male element from said female element, said retainer element comprising;
   (a) at least one, relatively deformable portion extending substantially parallel to the axis of said male element and adapted to orient said bushing element in operative position within said second annular chamber portion,
   (b) at least one relatively non axially deformable portion extending between the axially outer side of said enlarged diameter portion of said male element and said radially extending surface of said female element and thereby maintaining said retainer element within said chamber and preventing withdrawal of said male element from said female element,
   (c) said relatively deformable portion of said retainer being sufficiently long and deformable to allow sufficient radial movement of said relatively non-deformable retainer portion to permit said non-deformable portion to be biased radially outwardly by said enlarged diameter portion of said male element as said male element is inserted axially into said chamber, and to cause said relatively non-deformable portion to snap radially inwardly adjacent the axially outer side of said enlarged diameter portion when said male element is operatively positioned within said chamber.

2. In combination in a coupling for use in communicating a fluid media and comprising male, female, retainer, sealing and bushing elements, said male element being generally tubular shaped and including:
   (a) a first axially extending portion having a relatively smooth cylindrical exterior surface and disposed adjacent the terminal end of said male element,
   (b) a second axially extending portion of enlarged diameter disposed axially outwardly from said first portion and adapted for engagement with said retainer element,
   (c) a third axially extending portion disposed axially outwardly from said second portion and having an outer diameter smaller than the outer diameter of said second portion, said sealing element being of an annular configuration and disposed in axial registry with said first axially extending portion of said male element and having an inner diameter sealing engaged with said exterior surface thereof, said female element having an internal chamber adapted for operative reception of at least a portion of said male element and comprising;
   (a) a first annular portion communicable with a fluid passage and adapted to receive the terminal end of said male element;
   (b) a second annular portion disposed axially outwardly from said first annular portion and having a diameter greater than said first annular portion and comprising a cylindrical wall adapted for sealing engagement with the outer diameter of said sealing element,
   (c) a third annular portion disposed axially outwardly from said second annular portion and having a diameter at least as great as the outer diameter of said sealing element and adapted to operatively receive said retainer element, said third annular portion having means defining at least one radially extending surface cooperable with said retainer element for securing the same within said coupling and preventing disassembly of said male element from said female element, said bushing element adapted to be at least partially received in said second annular chamber portion of said chamber for limiting off axis movement of said male element, said retainer element comprising;
  (a) at least one, relatively deformable portion extending substantially parallel to the axis of said male element and adapted to orient said bushing element in operative position within said second annular chamber portion,
  (b) at least one relatively non axially deformable portion extending between the axially outer side of said enlarged diameter portion of said male element and said radially extending surface of said female element and thereby maintaining said retainer element within said chamber and preventing withdrawal of said male element from said female element,
  (c) said relatively deformable portion of said retainer being sufficiently long and deformable to allow sufficient radial movement of said relatively non-deformable retainer portion to permit said non-deformable portion to be biased radially outwardly by said enlarged diameter portion of said male element as said male element is inserted axially into said chamber, and to cause said relatively non-deformable portion to snap radially inwardly adjacent the axially outer side of said enlarged diameter portion when said male element is operatively positioned within said chamber.

3. In combination in a coupling for use in communicating a fluid media and comprising male, female, retainer, sealing and bushing elements, said male element being generally tubular shaped and including:
  (a) a first axially extending portion having a relatively smooth cylindrical exterior surface and disposed adjacent the terminal end of said male element,
  (b) a second axially extending portion of enlarged diameter disposed axially outwardly from said first portion and adapted for engagement with said retainer element,
  (c) a third axially extending portion disposed axially outwardly from said second portion and having an outer diameter smaller than the outer diameter of said second portion, said sealing element being of an annular configuration and disposed in axial registry with said first axially extending portion of said male element and having an inner diameter sealing engaged with said exterior surface thereof, said female element having an internal chamber adapted for operative reception of at least a portion of said male element and comprising;
  (a) a first annular portion communicable with a fluid passage and adapted to receive the terminal end of said male element;
  (b) a second annular portion disposed axially outwardly from said first annular portion and having a diameter greater than said first annular portion and comprising a cylindrical wall adapted for sealing engagement with the outer diameter of said sealing element,
  (c) a third annular portion disposed axially outwardly from said second annular portion and having a diameter at least as great as the outer diameter of said sealing element and adapted to operatively receive said retainer element, said third annular portion having means defining at least one radially extending surface cooperable with said retainer element for securing the same within said coupling and preventing disassembly of said male element from said female element, said bushing element adapted to be received in said second annular chamber portion of said chamber for preventing said sealing element from being expelled from said second chamber portion under the influence of fluid pressure in said passage, said retainer element comprising;
  (a) at least one, relatively deformable portion extending substantially parallel to the axis of said male element and means orienting and supporting said relatively deformable portion within said chamber,
  (b) at least one relatively non axially deformable portion extending between the axially outer side of said enlarged diameter portion of said male element and said radially extending surface of said female element and thereby maintaining said retainer element within said chamber and preventing withdrawal of said male element from said female element,
  (c) said relatively deformable portion of said retainer being sufficiently long and deformable to allow sufficient radial movement of said relatively non-deformable retainer portion to permit said non-deformable portion to be biased radially outwardly by said enlarged diameter portion of said male element as said male element is inserted axially into said chamber, and to cause said relatively non-deformable portion to snap radially inwardly adjacent the axially outer side of said enlarged diameter portion when said male element is operatively positioned within said chamber.

4. In combination in a coupling for use in communicating a fluid media and comprising male, female, retainer, sealing and bushing elements, said male element being generally tubular shaped and including:
  (a) a first axially extending portion having a relatively smooth cylindrical exterior surface and disposed adjacent the terminal end of said male element,
  (b) a second axially extending portion of enlarged diameter disposed axially outwardly from said first portion and adapted for engagement with said retainer element,
  (c) a third axially extending portion disposed axially outwardly from said second portion and having an outer diameter smaller than the outer diameter of said second portion, said sealing element being of an annular configuration and disposed in axial registry with said first axially extending portion of said male element and having an inner diameter sealing engaged with said exterior surface thereof, said female element having an internal chamber adapted for operative reception of at least a portion of said male element and comprising;

(a) a first annular portion communicable with a fluid passage and adapted to receive the terminal end of said male element;

(b) a second annular portion disposed axially outwardly from said first annular portion and having a diameter greater than said first annular portion and comprising a cylindrical wall adapted for sealing engagement with the outer diameter of said sealing element, (c) a third annular portion disposed axially outwardly from said second annular portion and having a diameter at least as great as the outer diameter of said sealing element and adapted to operatively receive said retainer element, said third annular portion having means defining at least one radially extending surface cooperable with said retainer element for securing the same within said coupling and preventing disassembly of said male element from said female element, said bushing element adapted to be received in said second annular chamber portion of said chamber for preventing said sealing element from being expelled from said second chamber portion under the influence of fluid pressure in said passage, said retainer element comprising;

(a) at least one, relatively deformable portion extending substantially parallel to the axis of said male element and adapted to limit axial movement of said bushing element within said internal chamber, (b) at least one relatively non axially deformable portion extending between the axially outer side of said enlarged diameter portion of said male element and said radially extending surface of said female element and thereby maintaining said retainer element within said chamber and preventing withdrawal of said male element from said female element, (c) said relatively deformable portion of said retainer being sufficiently long and deformable to allow sufficient radial movement of said relatively non-deformable retainer portion to permit said non-deformable portion to be biased radially outwardly by said enlarged diameter portion of said male element as said male element is inserted axially into said chamber, and to cause said relatively non-deformable portion to snap radially inwardly adjacent the axially outer side of said enlarged diameter portion when said male element is operatively positioned within said chamber.

5. In combination in a coupling for use in communicating a fluid media and comprising male, female, retainer, sealing and bushing elements, said male element being generally tubular shaped and including:

(a) a first axially extending portion having a relatively smooth cylindrical exterior surface and disposed adjacent the terminal end of said male element, (b) a second axially extending portion of enlarged diameter disposed axially outwardly from said first portion and adapted for engagement with said retainer element, (c) a third axially extending portion disposed axially outwardly from said second portion and having an outer diameter smaller than the outer diameter of said second portion, said sealing element being of an annular configuration and disposed in axial registry with said first axially extending portion of said male element and having an inner diameter sealing engaged with said exterior surface thereof, said female element having an internal chamber adapted for operative reception of at least a portion of said male element and comprising;

(a) a first annular portion communicable with a fluid passage and adapted to receive the terminal end of said male element;

(b) a second annular portion disposed axially outwardly from said first annular portion and having a diameter greater than said first annular portion and comprising a cylindrical wall adapted for sealing engagement with the outer diameter of said sealing element, (c) a third annular portion disposed axially outwardly from said second annular portion and having a diameter at least as great as the outer diameter of said sealing element and adapted to operatively receive said retainer element, said third annular portion having means defining at least one radially extending surface cooperable with said retainer element for securing the same within said coupling and preventing disassembly of said male element from said female element, said bushing element adapted to be at least partially received in said second annular chamber portion of said chamber for preventing said sealing element from being expelled from said second chamber portion under the influence of fluid pressure in said passage, said retainer element comprising;

(a) at least one, relatively deformable portion extending substantially parallel to the axis of said male element and adapted to orient said bushing element in operative position within said second annular chamber portion, (b) at least one relatively non axially deformable portion extending between the axially outer side of said enlarged diameter portion of said male element and said radially extending surface of said female element and thereby maintaining said retainer element within said chamber and preventing withdrawal of said male element from said female element, (c) said relatively deformable portion of said retainer being sufficiently long and deformable to allow sufficient radial movement of said relatively non-deformable retainer portion to permit said non-deformable portion to be biased radially outwardly by said enlarged diameter portion of said male element as said male element is inserted axially into said chamber, and to cause said relatively non-deformable portion to snap radially inwardly adjacent the axially outer side of said enlarged diameter portion when said male element is operatively positioned within said chamber.

6. In combination in a coupling for use in communicating a fluid media and comprising male, female, retainer, sealing and bushing elements, said male element being generally tubular shaped and including:

(a) a first axially extending portion disposed adjacent the terminal end of said male element, (b) a second axially extending portion of enlarged diameter disposed axially outwardly from said first portion and adapted for engagement with said retainer element, said sealing element being of an annular configuration and disposed in axial registry with said first axially extending portion of said male element and having an inner diameter sealing engaged with said exterior surface thereof, said female element having means defining an internal chamber adapted for operative reception of at least a portion of said male element and comprising;
  (a) a first annular portion communicable with a fluid passage and adapted to receive the terminal end of said male element;
  (b) a second annular portion disposed axially outwardly from said first annular portion and having a diameter greater than said first annular portion and comprising a wall adapted for sealing engagement with of said sealing element,
  (c) a third annular portion disposed axially outwardly from said second annular portion and having a diameter at least as great as the outer diameter of said sealing element and adapted to operatively receive said retainer element,
  (d) means defining at least one radially extending surface cooperable with said retainer element for securing the same within said coupling and preventing disassembly of said male element from said female element, said bushing element being interspaced between said sealing element and said retainer element, said retainer element comprising;
  (a) at least one, relatively deformable portion extending substantially parallel to the axis of said male element,
  (b) at least one relatively non axially deformable portion extending between the axially outer side of said enlarged diameter portion of said male element and said radially extending surface,
  (c) said relatively deformable portion of said retainer being sufficiently long and deformable to allow sufficient radial movement of said relatively non-deformable retainer portion to permit said non-deformable portion to be biased radially outwardly by said enlarged diameter portion of said male element as said male element is inserted axially into said chamber, and to cause said relatively non-deformable portion to snap radially inwardly adjacent the axially outer side of said enlarged diameter portion when said male element is operatively positioned within said chamber for preventing withdrawal of said male element from said female element.

* * * * *

UNITED STATES PATENT AND TRADEMARK OFFICE
CERTIFICATE OF CORRECTION

PATENT NO. : 5,067,754

DATED : November 26, 1991

INVENTOR(S) : Donald D. Bartholomew

Page 1 of 2

It is certified that error appears in the above-identified patent and that said Letters Patent is hereby corrected as shown below:

ON THE TITLE PAGE, under "Assignee", item [73],
"Propietary" should be --Proprietary--.

item ]56],
ON THE TITLE PAGE, under "References Cited", "U.S. PATENT DOCUMENTS",
"4,748,175" should be --4,948,175--.

Column 1, line 24,
After "as", delete "a".

Column 1, lines 52 - 65,
Delete "It is yet another object of the present invention to provide a removable, disposable cover for protecting the pre-assembled connector conduit unit.

It is a further object of the present invention to provide a disposable stuffer-plug for the connector assembly which is adapted to install one or more sealing elements in an axial bore of the connector housing and detachably secure a retainer element to the connector housing, as well as to seal the axial bore of the connector housing.

It is still a further object of the present invention to provide a connector assembly which employs a check valve unit disposed in the axial bore of the housing for selectively blocking fluid flow."

Column 3, line 38,
"complimentary" should be --complementary--.

Column 5, line 50,
"from" should be --form--.

UNITED STATES PATENT AND TRADEMARK OFFICE
CERTIFICATE OF CORRECTION

PATENT NO. : 5,067,754

DATED : November 26, 1991

INVENTOR(S) : Donald D. Bartholomew

It is certified that error appears in the above-identified patent and that said Letters Patent is hereby corrected as shown below:

Column 6, line 12,
    "26" should be --5--.

Column 13, line 20, claim 6,
    After "with", insert --the outer diameter--.

Signed and Sealed this

Twenty-eighth Day of September, 1993

Attest:

BRUCE LEHMAN

*Attesting Officer*      *Commissioner of Patents and Trademarks*